United States Patent [19]

Schroeder et al.

[11] 4,115,600

[45] Sep. 19, 1978

[54] METHOD FOR FORMING A METAL TERMINATION ON A WOUND CAPACITOR SECTION

[75] Inventors: Walter W. Schroeder, Williamstown; Noel C. Sears, Dalton; Joseph C. Boni, Williamstown, all of Mass.

[73] Assignee: Sprague Electric Company, North Adams, Mass.

[21] Appl. No.: 783,927

[22] Filed: Apr. 1, 1977

[51] Int. Cl.[2] .......................... H01G 7/00; B05D 5/12
[52] U.S. Cl. ...................................... 427/79; 427/123; 427/282; 427/398 R; 427/398 C; 427/398 D; 427/423; 427/425; 361/309; 361/323; 29/25.42
[58] Field of Search ................ 427/79, 282, 423, 425, 427/123, 349, 80, 398 R, 398 D, 398 C; 361/309, 323; 29/25.42

[56] References Cited

U.S. PATENT DOCUMENTS

| 3,256,472 | 6/1966 | Centurioni | 361/309 |
| 3,573,960 | 4/1971 | Duncan | 427/282 |
| 3,891,901 | 6/1975 | Booe | 361/309 |

Primary Examiner—Michael F. Esposito
Attorney, Agent, or Firm—Connolly and Hutz

[57] ABSTRACT

A metal termination is formed at the end of a wound capacitor section by rotating the section while spraying a molten metal. A shield plate is placed between the spray nozzle and a portion of the section end so that each incremental surface region of the section end being sprayed is shielded from the molten metal spray during part of each period of rotation. This causes a periodic cooling of each surface region of the section end during spraying so that any desired thickness of termination may be quickly deposited without risk of damaging the section end which may contain plastic or paper dielectric sheet materials that are easily deformed or disintegrated by conventional molten metal spraying methods.

8 Claims, 5 Drawing Figures

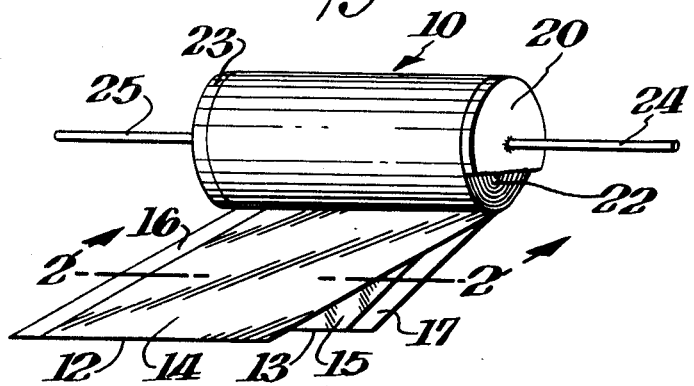
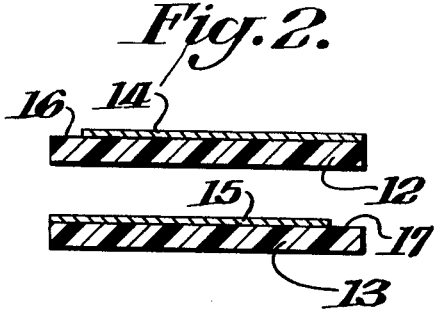
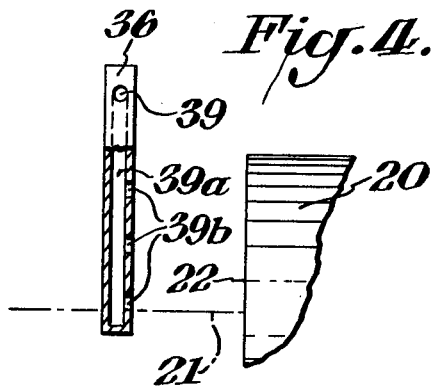
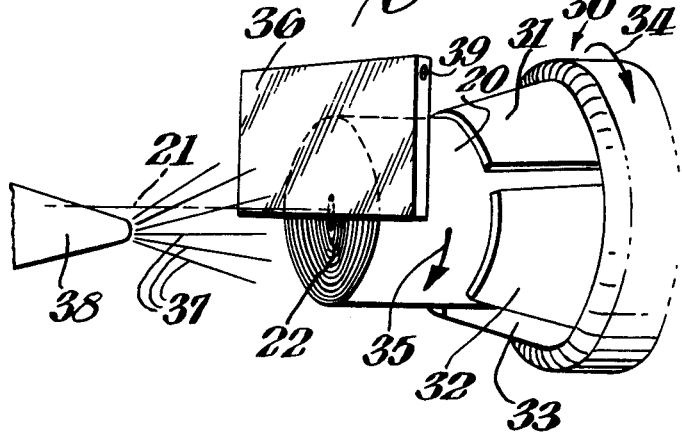
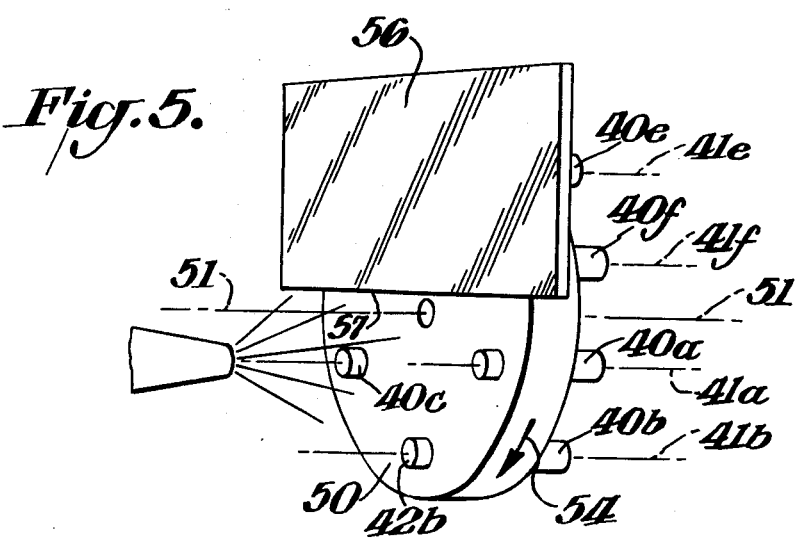

METHOD FOR FORMING A METAL TERMINATION ON A WOUND CAPACITOR SECTION

BACKGROUND OF THE INVENTION

This invention relates to a method for forming a metal termination at the end of a wound capacitor section and more particularly to the metal spray deposition of capacitor terminals.

It is well known to apply by spraying low melting temperature metals such as zinc, alloys of aluminum and solders to the ends of a wound capacitor section. This method is indeed the only practical termination method for use in some wound capacitors having metallized thermoplastics dielectric layers. The spray method conventionally employed is critical in that the molten metal particles impacting the end of such a capacitor must impact the exposed edges of an electrode with sufficient force and at a sufficient temperature to remove the oxide from the electrode edge and to make a sound electrical connection between the sprayed metal and the electrode. At the same time, the molten metal particles must not impact the thermoplastic dielectric material with so great a force and at so high a temperature that substantial physical distortion and damage occurs along the thermoplastic edge. It is particularly difficult to apply a thick and strong metal termination to such a capacitor because the temperature of the section end rapidly reaches destructively high values. It is conventional to apply a series of thin layers with long waiting times between layers to achieve the desired thickness and strength.

It is therefore an object of this invention to provide a method for the metal spray deposition of a termination to a wound capacitor requiring a minimum of handling and having a minimum number of steps.

It is a further object of this invention to provide a rapid low cost method for depositing a metal termination to an end of a wound capacitor section which section has heat sensitive dielectric layers.

SUMMARY OF THE INVENTION

A method for forming a metal termination at the end of a wound capacitor section comprises rotating the section about an axis that is essentially parallel to the axis of the section, placing a shield plate adjacent to and spaced from an end of the rotating section and spraying a molten metal onto the section end. The shield plate is offset with respect to the axis of rotation to expose each region of the section end to the sprayed metal for substantially less than the full period of a revolution of the section. The method of this invention is particularly advantageous for depositing a metal termination to the end of a capacitor section which section has two metal sheet electrodes that are spaced by and may be supported by thermoplastic dielectric layers. Some thermoplastic dielectric materials typically employed in wound capacitors are polypropylene, polyethyleneterephthalate, polycarbonate, polystyrene, and certain fluorocarbons. The alternate deposition and cooling that is effected in the method of this invention is capable of preventing substantial distortion of the thermoplastic material at the section end being sprayed. Such distortion and melting typically results in poor and inefficient electrical connection between the sprayed termination and the electrode and often results in a short between the adjacent of the electrodes. At the same time, a thick strong termination layer may be deposited by this novel method within a matter of seconds with a minimum of handling. The result is an improved quality termination having a lower cost of manufacturing.

This invention recognizes the principle that during metal spray deposition, the more frequently the spray deposition is interrupted by a cooling period, the lower the average temperature of the object being sprayed becomes. Also accompanying this trend is a lower value of peak temperature that is reached by the object being sprayed. The number of alternate spray deposit and cooling cycles employed to deposit a given thickness of metal coating in a given time may readily be increased by increasing the rate of rotation at no additional cost.

BRIEF DESCRIPTION OF THE DRAWINGS

FIG. 1 shows in perspective view a wound capacitor having been partially unrolled.

FIG. 2 shows in sectional view taken in place 2—2, the electrodes and dielectric layers of the partially unrolled capacitor of FIG. 1.

FIG. 3 shows in perspective view a wound capacitor being end sprayed in accordance with the method of this invention.

FIG. 4 shows in a partially cut away side view the shield of FIG. 3.

FIG. 5 shows in perspective view a plurality of capacitors being simultaneously end sprayed by the method of this invention.

DESCRIPTION OF THE PREFERRED EMBODIMENTS

The wound capacitor section 10 shown in FIG. 1 comprises dielectric layers 12 and 13 having deposited thereon submicron thick aluminum films 14 and 15, respectively. The dielectric layers 12 and 13 are polypropylene. Other dielectric material would also be suitable such as other plastics or paper. The films 14 and 15 serve as the capacitor electrodes in the capacitor section 10 and are positioned in the conventional "extended foil" manner so that each of the electrodes extends outwardly beyond the other at one of the section ends. This is accomplished here by providing unmetallized margins 16 and 17 at opposite edges of the two layers 12 and 13, respectively.

A spray deposited metal terminal 20, as shown partially cut away in FIG. 1, makes contact to electrode film 14, the cut away portion revealing section end 22. Another terminal 23 contacts film 15 at the opposite end of the wound section 10. The vertical or thickness dimensions of the various layers and films in FIG. 2 are greatly exaggerated to clearly show the construction. The plastic layers 12 and 13 are typically less than 0.001 inches thick while electrode films 14 and 15 may extend 0.1 inches outwardly of each other such that the unmetallized layer margins 16 and 17 are 0.1 inch wide. The spray deposition of terminals 20 and 23 will not result in a conductive metal path being formed between the two electrodes 14 and 15 unless the hot molten metal being sprayed melts or disintegrates the edges of the dielectric layers.

After the terminals have been spray deposited at both ends of the capacitor section, lead wires such as 24 and 25 may be soldered or welded directly to the sprayed terminals. The electrode films 14 and 15 are typically deposited by vacuum evaporation and are usually less than 1000Å in thickness. The vacuum deposited films are usually of aluminum or zinc. The terminations are usually zinc or aluminum-alloys. The method of this invention is also advantageously employed for forming terminations of wound capacitors having off set foil electrodes. Such a foil capacitor is disclosed in the U.S. Pat. No. 3,049,651 issued Aug. 14, 1962 and assigned to the same assignee as is the present invention.

In FIG. 3 a wound capacitor section 20 is shown mounted and firmly held by a rotating chuck 30. Chuck jaws 31, 32 and 33 grip the capacitor 20 such that rotation of the chuck causes the capacitor section to rotate about section axis 21 in a direction as shown by arrows 34 and 35. A shield plate 36 is mounted adjacent to but spaced from capacitor section end 22 and is offset with respect to the axis of rotation so as to expose only a portion of capacitor section end 22 to the sprayed metal 37 being discharged from the metal spray nozzle 38. Any of the various standard metal spray equipments will be suitable including those employing a plasma arc, flammable gas, compressed air and combinations thereof.

The above described method of holding and rotating the capacitor section is particularly suitable for sections having large diameters. For example, a capacitor section of diameter 2.0 inches and length of 4 inches was held in a chuck and rotated at 200 rpm. The spray nozzle was adjusted to produce a 1½ inch diameter spot at 5 inches distance from the capacitor section. A shield plate was employed to cover approximately half of the section end. The metal shield was effective in shielding about half of the section end at any instant of time from sprayed metal and from radiant heat emanating from the spray gun. Thus, each incremental region in the section end was alternately subject to metal spray deposition and to cooling. The rotation of the section in the ambient air enhances the cooling.

As illustrated in FIG. 4, to achieve even more efficient cooling, the shield plate 36 was constructed with an inlet port 39 remote from the section leading to a cavity 39a having outlet ports 39b facing the section end 22. A cooling gas, namely air, was admitted to the inlet port under pressure to further accelerate the carrying away of heat from the section end being sprayed. A termination of about 0.015 inch thickness was deposited on the section end within 6 seconds. Faster cooling yet may be accomplished by the use of refrigerated gases, for example, gas from compressed liquid nitrogen or carbon dioxide.

In an alternative embodiment of this invention a plurality of capacitor sections 40a through 40f are shown in FIG. 5, all mounted in a rotatable disk 50. The axes 41a through 41f, respectively, of the capacitor sections 40a through 40f, are all essentially parallel to each other and to the axis 51 of rotation of disk 50. Note that this is similar to the above described embodiment wherein the axis of rotation at section 20 corresponds to the axis 21 of the capacitor section. The direction of rotation is shown by arrow 54. In this way the angle of incidence of the sprayed molten metal upon the ends of the capacitors is essentially normal. A shield plate 56 is mounted in a plane orthogonal with the axis 51 and is spaced from the ends of the capacitor sections. The lower edge 57 (as shown) of the shield plate 56 is adjusted to approximately intersect the axis 51 of the rotating disk 50. In this way the end (e.g. 42b) of each section is subjected to metal spray deposition for approximately half of each period of revolution and is cooled during the other half of each period of revolution.

Of course, the plate may be withdrawn in a direction away from the axis 51, e.g. upward as shown, to achieve an increase in the exposure to spray deposition over the cooling that takes place during each revolution. Alternatively, the shield plate may be positioned over the entire surface of the disk 50 but may have one or more slots through which the spraying is effected. Thus, the various mounting positions and/or geometries of the shield plate permit adjustment of the spray time to cool time ratio over the entire range between the extremes from 1 to 0.

The method by which a plurality of capacitor sections may be simultaneously sprayed as illustrated in FIG. 5 is particularly suitable for providing terminations to small capacitor sections such as those having a diameter less than ½ inch. The means by which the capacitor section is mounted in such a rotating member is not critical. It is only necessary that the mounting be firm enough to prevent "blowing away" the section by the force of the spray metal. For example, each section may be mounted as illustrated in FIG. 5 by wedging or force fitting the section into a hole in the disk 50.

In a further embodiment (not illustrated) of the method of this invention both ends of one or more wound capacitor sections may be simultaneously terminated. For example, the apparatus of FIG. 5 may be modified by adding a second shield plate near the other (right hand) ends of the capacitor sections and mounting a second spray gun facing the other ends. The oppositely directed guns and shields may conventionally be positioned symmetrically with respect to the rotating disc 50.

What is claimed is:

1. A method for forming a metal termination at an end of a wound capacitor section, said wound section including two metal electrodes being spaced by dielectric layers, one of said electrodes extending outwardly from the other of said electrodes at an end of said section, said dielectric layers being selected from polypropylene, polyethyleneterephthalate, polycarbonate, polystyrene and fluorocarbons, comprising (a) rotating said section about an axis that is parallel to the axis of said wound section; (b) placing a shield plate adjacent to and spaced from said end of said wound section; and (c) spraying a molten metal onto said section end during said rotating, said placing including offsetting said shield plate with respect to said axis of rotation to expose each region of said section end to said sprayed metal for less than the full period of a revolution of said rotation whereby said shield plate allows each region of said section end to undergo some periodic cooling during a complete revolution of said section.

2. The method of claim 1 wherein said one electrode is a submicron thick metal film.

3. The method of claim 1 wherein said axis of revolution coincides with said axis of said capacitor section.

4. The method of claim 1 wherein said offsetting is accomplished by adjusting one edge of said shield plate to approximately intersect said axis of rotation to expose said each region of said section end during each revolution for approximately half of said period of revolution.

5. The method of claim 1 wherein a gas is directed at said section end from within said space between said shield plate and said section end for the purpose of intermittently cooling said each region of said section end.

6. The method of claim 5 wherein said cooling gas is admitted under pressure to an inlet port provided in said shield, said inlet port leading through a cavity in said shield to outlet ports that face said rotating section.

7. The method of claim 1 additionally comprising simultaneously forming a metal termination at an end of at least another wound capacitor section by simultaneously rotating said wound sections, said sections having mutually parallel axes and each section being spaced away from said axis of rotation.

8. The method of claim 1 additionally comprising placing another shield plate adjacent and spaced from the other end of said wound section; and spraying a molten metal onto said other section end during said rotating for simultaneously forming two metal terminations on said two ends, respectively.

* * * * *